United States Patent [19]

Alfredsson

[11] Patent Number: 5,150,628
[45] Date of Patent: Sep. 29, 1992

[54] GEARBOX FOR AUTOMOTIVE VEHICLES

[75] Inventor: Sverker Alfredsson, Västra Frölunda, Sweden

[73] Assignee: AB Volvo, Gothenburg, Sweden

[21] Appl. No.: 804,497

[22] Filed: Dec. 10, 1991

Related U.S. Application Data

[63] Continuation of Ser. No. 394,413, Aug. 14, 1989, abandoned.

[30] Foreign Application Priority Data

Aug. 12, 1988 [SE] Sweden ................................. 8802885

[51] Int. Cl.⁵ .............................................. F16H 3/38
[52] U.S. Cl. .......................................... 74/330; 74/331; 74/360
[58] Field of Search ........................... 74/330, 331, 360

[56] References Cited

U.S. PATENT DOCUMENTS

| | | | |
|---|---|---|---|
| 2,543,412 | 2/1951 | Kegresse | 74/330 |
| 2,599,801 | 6/1952 | Youngren et al. | 74/330 |
| 2,612,787 | 10/1952 | Youngren et al. | 74/330 |
| 2,644,340 | 7/1953 | Youngren et al. | 74/330 |
| 4,106,358 | 8/1978 | Morrison | 74/331 |
| 4,461,188 | 7/1984 | Fisher | 74/330 |
| 4,876,907 | 10/1989 | Andersson et al. | 74/331 |

FOREIGN PATENT DOCUMENTS

| | | |
|---|---|---|
| 0278938 | 8/1988 | European Pat. Off. . |
| A12435 | 8/1956 | Fed. Rep. of Germany ........ 74/331 |
| 433870 | 6/1984 | Sweden . |
| 2079877 | 1/1982 | United Kingdom .................. 74/331 |
| 2172944 | 10/1986 | United Kingdom . |

Primary Examiner—Richard Lorence
Assistant Examiner—William O. Trousdell
Attorney, Agent, or Firm—Young & Thompson

[57] ABSTRACT

A gearbox for automotive vehicles includes two mutually concentrically journalled input shafts (6,9), each of which drives a respective lay-shaft (12,15). A gear wheel (17,19) disengageably mounted on each lay-shaft meshes with a common, disengageable gear wheel (22) on the output shaft (20) of the gearbox. When driving in first gear, the one lay-shaft (12) drives the other lay-shaft (15) via the disengaged or declutched common gear wheel (20) on the output shaft.

1 Claim, 1 Drawing Sheet

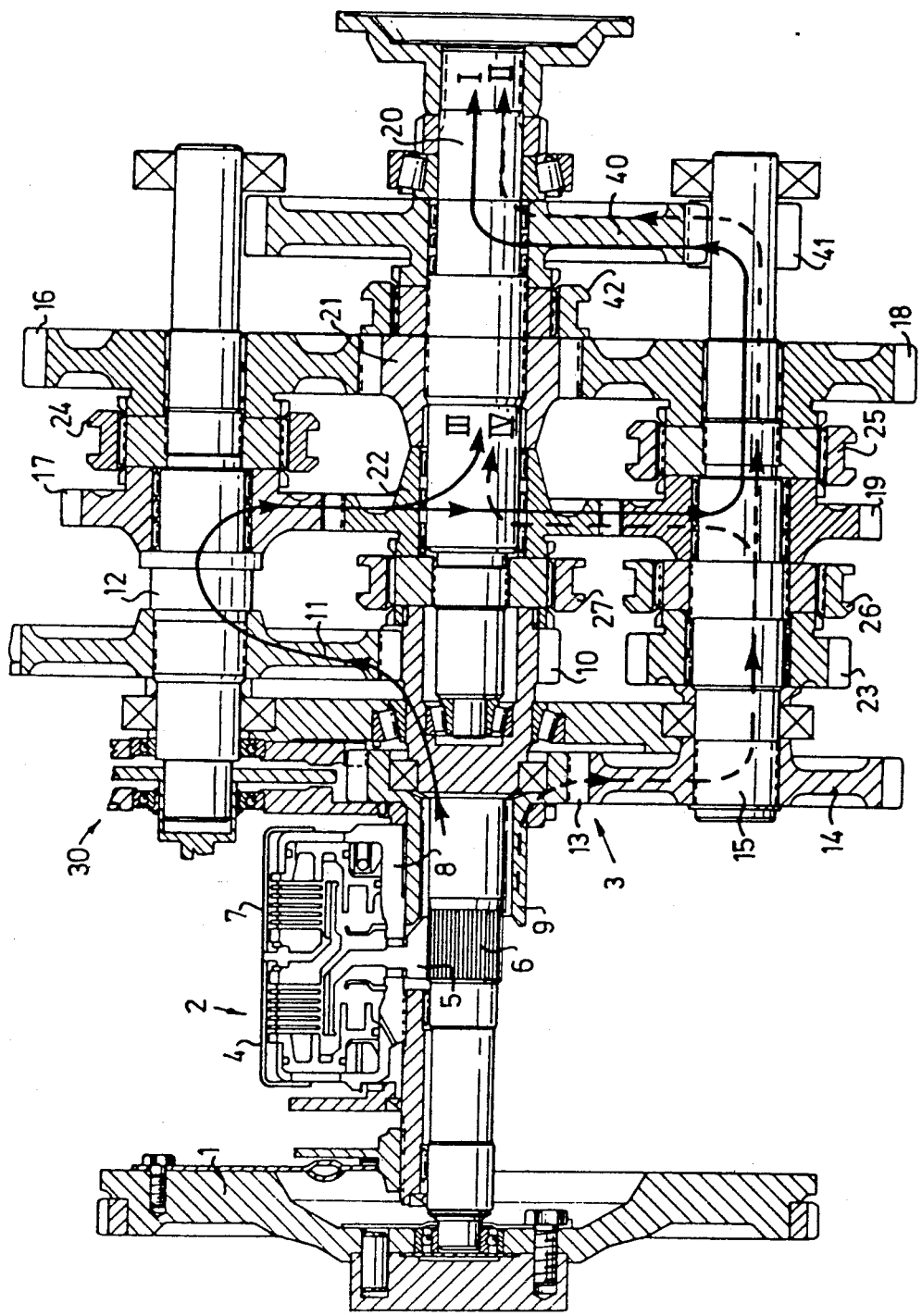

GEARBOX FOR AUTOMOTIVE VEHICLES

This application is a continuation of application Ser. No. 07/394,413, filed Aug. 14, 1989, now abandoned.

The present invention relates to a gearbox intended for automotive vehicles and being of the kind which comprises two concentrically journalled and alternately driven input shafts and two lay-shafts which are driven by the input shafts and which carry gear wheels which mesh with gear wheels mounted on an output shaft, wherein at least one gear wheel rotatably mounted on each lay-shaft and capable of being locked on its respective shaft by coupling means is in engagement with a common gear wheel on the output shaft.

Double lay-shafts are used in gearboxes with which it is desired to obtain a greater number of gear shifts for a given length of gearbox than would be possible in practice with a conventional gearbox construction with one lay-shaft, and also in so-called "power-shift" gearboxes, i.e. gearboxes having double input shafts, each of which is driven by its respective clutch. In gearboxes of this kind, the gear positions are first preselected and the actual gear change or shift is then effected by disengagement of one of said clutches and engagement of the other. For instance, in the case of a six-gear gearbox, the first, third and fifth gears are each obtained through one of the input shafts and one of said lay-shafts, the second and fourth gears are obtained through the other of said input shafts and the other lay-shaft, and the sixth gear is obtained through a direct coupling between the first mentioned input shaft and the output shaft.

The diameter of the low transmission-ratio gear wheels on the lay-shafts of gearboxes of this kind intended particularly for heavy goods vehicles and working vehicles is very small, due to the construction of the gearbox with common gear wheels mounted on the main shaft for meshing engagement with opposing gear wheels on the lay-shafts. In those instances where the low transmission-ratio gear wheels are disengageable on their respective shafts, it is necessary to journal the small-diameter gear wheels on needle bearings, which means that the gear wheel hub will be very thin, because of the small diameters involved in this particular case, with subsequent restriction in the torque that can be transmitted.

U.S. Pat. No. 4,876,907 describes and illustrates a gearbox of this kind, in which the lay-shaft gear wheels of the second and third gears are disengageable on their respective shafts and mesh with a fixed gear wheel mounted on the main shaft. The teeth of the lay-shaft gear wheel of the first gear, on the other hand, are formed directly on the lay-shaft, thereby enabling the gear wheel to be given a very small diameter and to transmit high torque nevertheless.

The object of the present invention is to provide, with a starting point from the gearbox taught by U.S. Pat. No. 4,876,907, a gearbox of the aforesaid kind which will enable very high transmission ratios to be obtained on the lowest gears without the use of extremely small disengageable lay-shaft gear wheels and which incorporates a seventh gear, with the structural length of the gearbox and its degree of complication essentially unchanged.

This object is achieved in accordance with the invention in that said common gear wheel on the output shaft is mounted for free rotation and can be locked to the shaft with the aid of coupling means, and in that when disengaged the common gear wheel is operative to transmit torque from one lay-shaft to the other.

As a result of this solution it is possible, while using the disengaged main-shaft gear wheel as an intermediate gear wheel, to achieve a reduction in speed in a further stage, via the other lay-shaft, and to utilize the circumstance that the primary gear of this lay-shaft has a higher transmission ratio than the other lay-shaft. This enables a sufficiently high total transmission ratio to be obtained for the first gear and also enables gear teeth formed directly in the other lay-shaft to be utilized to transmit torque to the output shaft, both in first and second gear.

The invention will now be described in more detail with reference to exemplifying embodiments thereof and with reference to the accompanying drawing, the single figure of which is a longitudinal sectional view of a seven gear gearbox for automotive vehicles.

In the drawing, the reference numeral 1 identifies an engine flywheel which drives an inventive gearbox 3 via a wet multiplate clutch assembly generally referenced 2. The clutch assembly is a double-clutch assembly of known kind and therefore need not be described in detail. The clutch unit 4, shown on the left of the drawing, is connected to a first input shaft 6 of the gearbox via a coupling sleeve element 5 whereas the right-hand clutch unit 7 is connected, via a coupling sleeve element 8, to a second input shaft 9 which is of hollow construction and journalled concentrically with the first shaft 6. The two clutch units can be engaged and declutched alternately in a known manner, for alternate drive of respective input shafts 6 and 9. The illustrated wet multiplate clutch can be replaced with a double dry-plate clutch.

The first input shaft 6 is configured with a gear ring or set of gear teeth 10 which meshes with a gear wheel 11 fixedly mounted on a first lay-shaft 12. The second input shaft 9 is configured with a set of gear teeth or gear ring 13 which meshes with a gear wheel 14 fixedly mounted on a second lay-shaft 15. The gear ring 13 is larger than the gear ring 10 and thus the second lay-shaft 15 will rotate faster than the first lay-shaft at the same input speed of respective input shafts.

Each of the lay-shafts 12 and 15 carries a respective pair of freely rotatable gear wheels 16, 17 and 18,19 of which the gear wheels 16,18 mesh commonly with a gear wheel 21 fixedly mounted on an output shaft 20, whereas the gear wheels 17,19 mesh with a gear wheel 22 provided with coupling teeth and mounted for free rotation on the output shaft. The shafts are disposed in a V-configuration so as to enable the direction of rotation of either lay-shaft to be changed with the aid of an additional gear wheel 23 located on the lay-shaft 15 and meshing with the gear wheel 11 on the lay-shaft 12, for driving the vehicle in reverse. The rotational direction of respective lay-shafts can also be changed with the aid of a gear wheel which is mounted on a separate shaft in the gearbox housing and which meshes with the sets of gear teeth or gear rings 10 and 23. This provides greater freedom in the selection of the aforesaid V-configuration and transmission ratios and also enables the shafts to be placed in mutually the same plane. The gear wheels 16,17,18,19 and 23 can be locked onto their respective shafts with the aid of axially displaceable coupling sleeves 24,25 and 26. A gear wheel 40 which is freely rotatable on the output shaft 20 meshes with a gear ring 41 formed directly in the lay-shaft 15 and can be locked on the shaft 20 with the aid of a coupling sleeve 42. Because the gear ring 41 is formed directly in the lay-shaft 15 and because the gear wheel 40 can be locked on the output shaft, it is no longer necessary to journal the lay-shaft gear wheel on needle bearings and consequently the gear wheel can be given a very small diameter, which in turn provides a large transmission stage from lay-shaft to output shaft. The freely rotatable wheel 22 can be locked on the output shaft with the aid of a coupling sleeve 27 and the input shaft 6 and the output shaft 20 can be locked together for direct drive (transmission ratio 1:1). All of these couplings lack individual, conventional synchronizing devices.

In the case of the illustrated embodiment, the coupling sleeves 24,25,26,27 and 42 lack coacting synchronizing devices. Instead, the embodiment includes a so-called central synchronizing arrangement, generally referenced 30, which is of the kind described and illustrated in U.S. Pat. No. 4,876,907 and which forms no part of the present invention. The reader is referred to the aforementioned patent for a more detailed description of the actual transmission process when using central synchronization. It will be understood, however, that the present gearbox described and illustrated here can be fitted with individual, conventional synchronizing devices for each coupling sleeve instead of a central synchronizing arrangement.

The illustrated gearbox is shown in its neutral state with all freely rotatable gear wheels disengaged from their respective shafts. The power flow from the input shaft 6 to the output shaft 20 when driving in first and third gear is indicated by full-line arrows, whereas the broken-line arrows indicate the power flow from the input shaft 9 to the output shaft 20, when driving in second and fourth gear.

When driving in first gear, the coupling sleeve 24 locks the gear wheel 17 on the lay-shaft 12, the coupling sleeve 42 locks the gear wheel 40 on the output shaft 20 and the coupling sleeve 25 locks the gear wheel 19 on the lay-shaft 15. The coupling sleeve 27 of the freely rotatable wheel 22 lies in the neutral position, such as to free the wheel 22. As will be seen from the drawing, torque is transmitted from the input shaft 6, via the locked gear wheel 17 on the lay-shaft 12 and freely rotatable gear wheel 22, to the locked gear wheel 19 on the other lay-shaft 15, and from there to the locked gear wheel 40 on the output shaft, via the gear ring 41. When the second gear is engaged, the drive is effected from the input shaft 9 to the lay-shaft 15, with the gear wheel 19 disengaged. The torque is also transmitted to the output shaft via the gear ring 41, when the second gear is engaged. Thus, in the case of the two lowest gears, torque is transmitted via one and the same gear ring 41 which, because it is formed directly in the lay-shaft, is able to withstand a greater load than a needle-journalled gear wheel of corresponding size. When driving in third and fourth gear, the gear wheel 22 is locked on the output shaft and the gear wheel 40 is disengaged prior to changing to fourth gear. The torque is transmitted via the gear wheels 17 and 19 respectively.

It will be understood that the invention can be applied with gearboxes which include more or less gears than the described gearbox. Furthermore, the short constructional length of the gearbox can be reduced still further, by modifying the number and positioning of the coupling sleeves. For instance, all sleeves can be placed axially in solely two rows.

I claim:

1. In a gearbox for automotive vehicles, comprising two mutually concentrically journalled and alternately driven input shafts and two lay-shafts which are driven by the input shafts and which carry gear wheels which mesh with gear wheels on an output shaft, wherein at least one gear wheel rotatably mounted on each lay-shaft and capable of being locked on said each shaft by coupling means meshes with a common gear wheel on the output shaft; the improvement wherein said common gear wheel (22) on the output shaft (20) is journalled for free rotation and can be selectively locked on the shaft with the aid of movable coupling means (27) which in another position release said common gear wheel (22) and lock said output shaft (20) and one of said input shafts (6) together for direct drive, and wherein when in its freely rotatable state the common gear wheel is operative to transmit torque from one to the other of said lay-shafts (12 and 15 respectively).

* * * * *